United States Patent
Yamada et al.

(10) Patent No.: US 8,785,032 B2
(45) Date of Patent: Jul. 22, 2014

(54) MULTILAYER POROUS FILM, SEPARATOR FOR BATTERIES, AND BATTERY

(75) Inventors: Hiroto Yamada, Nagahama (JP); Tomoyuki Nemoto, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 14/123,120

(22) PCT Filed: May 31, 2012

(86) PCT No.: PCT/JP2012/064168
§ 371 (c)(1),
(2), (4) Date: Nov. 29, 2013

(87) PCT Pub. No.: WO2012/165580
PCT Pub. Date: Dec. 6, 2012

(65) Prior Publication Data
US 2014/0099530 A1    Apr. 10, 2014

(30) Foreign Application Priority Data

Jun. 2, 2011    (JP) ................................ 2011-123904

(51) Int. Cl.
*H01M 2/16*    (2006.01)
(52) U.S. Cl.
USPC ........ 429/144; 429/145; 428/316.6; 428/220; 428/304.4
(58) Field of Classification Search
CPC .... H01M 2/145; H01M 2/166; H01M 2/1686
USPC ............. 429/144, 145; 428/316.6, 220, 304.4
See application file for complete search history.

(56) References Cited

U.S. PATENT DOCUMENTS

2010/0159776 A1*  6/2010  Jones et al. .................. 442/394
2010/0285348 A1   11/2010  Murata et al.

FOREIGN PATENT DOCUMENTS

| JP | 04-181651 A | 6/1992 |
| JP | 08-144122 A | 6/1996 |
| JP | 09-194650 A | 7/1997 |
| JP | 2003-306585 A | 10/2003 |
| JP | 2004-227972 A | 8/2004 |
| JP | 3739481 B2 | 11/2005 |
| JP | 2007-280911 A | 10/2007 |
| JP | 2008-186721 A | 8/2008 |
| WO | WO 2010/008003 A1 | 1/2010 |

OTHER PUBLICATIONS

International Search Report issued Aug. 28, 2012 in PCT/JP2012/064168.

* cited by examiner

*Primary Examiner* — Milton I Cano
*Assistant Examiner* — Jimmy K Vo
(74) *Attorney, Agent, or Firm* — Oblon, Spivak, McClelland, Maier & Neustadt, L.L.P.

(57) ABSTRACT

The present invention is capable of providing a multilayer porous film used as a separator for a non-aqueous electrolyte secondary battery. A multilayer porous film which is obtained by laminating a coating layer that contains a filler and a resin binder on at least one surface of a polyolefin resin porous film that serves as a base layer. The ratio of the average particle diameter (Du) of the filler within 25% of the thickness of the coating layer from the surface of the multilayer porous film to the average particle diameter (Db) of the filler within 25% of the thickness of the coating layer from the interface with the base layer, namely, Du/Db is 1.2 to 10; and the average particle diameter (Du) is 0.5 μm or less.

15 Claims, 3 Drawing Sheets

(A)

(B)

MULTILAYER POROUS FILM, SEPARATOR FOR BATTERIES, AND BATTERY

TECHNICAL FIELD

The present invention relates to a multilayer porous film which can be utilized as packing, hygiene, livestock, agricultural, building, and medical materials, and as a separation film, a light diffusing plate, and a separator for a battery, and particularly to a multilayer porous film which can be preferably utilized as a separator for a lithium-ion secondary battery which is a nonaqueous electrolytic solution battery.

BACKGROUND ART

A polymeric porous material having a large number of intercommunicable micropores is utilized in various fields, for example, as separation films to be used to produce ultrapure water, purify chemicals, and treat water; a waterproof moisture-permeable film to be used for clothes and sanitary materials; and the separator for use in the battery.

A secondary battery is widely used as the power source of OA, FA, household appliances, and portable apparatuses such as communication instruments. A lithium-ion secondary battery has a favorable volumetric efficiency when it is mounted on apparatuses and allows the apparatuses to be compact and lightweight. Therefore there is an increase in the use of portable devices in which the lithium-ion secondary battery is used. Owing to research and development of a large secondary battery which has been made in the field of load leveling, UPS, an electric vehicle, and in many fields relating to the problem of energy and environment, the lithium-ion secondary battery which is a kind of a nonaqueous electrolytic solution secondary battery has widely spread in its use because the lithium-ion secondary battery has a large capacity, a high output, a high voltage, and an excellent long-term storage stability.

The lithium-ion secondary battery is so designed that the upper limit of the working voltage thereof is usually 4.1V to 4.2V. Because electrolysis occurs in an aqueous solution at such a high voltage, the aqueous solution cannot be used as an electrolyte. Therefore as an electrolytic solution capable of withstanding a high voltage, a so-called nonaqueous electrolytic solution in which an organic solvent is used is adopted. As a solvent for the nonaqueous electrolytic solution, an organic solvent having a high permittivity which allows a large number of lithium ions to be present is widely used. An organic carbonate ester compound such as polypropylene carbonate or ethylene carbonate is mainly used as the organic solvent having a high permittivity. As a supporting electrolyte serving as the ion source of the lithium ion in the solvent, an electrolyte having a high reactivity such as lithium phosphate hexafluoride is used in the solvent by dissolving it therein.

The separator is interposed between the positive electrode of the lithium-ion secondary battery and its negative electrode to prevent an internal short circuit from occurring. Needless to say, the separator is demanded to have insulating performance as its role. In addition the separator is required to have a porous structure so that air permeability of allowing lithium ions to pass therethrough and a function of diffusing and holding the electrolytic solution are imparted to the separator. To satisfy these demands, a porous film is used for the separator.

Because batteries having a high capacity are used recently, the degree of importance for the safety of the battery has increased. A shut-down property (hereinafter referred to as SD property) contributes to the safety of the separator for the battery. The SD property is the function of preventing the temperature inside the battery from rising owing to closing of micropores when the battery has a high temperature of 100° C. to 150° C., which leads to shut-off of ion conduction inside the battery off. The lowest temperature of temperatures at which the micropores of a multilayer porous film are closed is called a shut-down temperature (hereinafter referred to as SD temperature). To use the multilayer porous film as the separator for the battery, it is necessary for the multilayer porous film to have the SD property.

Because the lithium-ion secondary battery has become higher in its energy density and power in recent years, the normal shut-down property does not sufficiently work. Thus the temperature inside the battery rises over 150° C. which is the melting point of PE and continues to rise. As a result, a short circuit occurs between the positive and negative electrodes owing to breakage of the separator caused by thermal contraction, which may lead to the occurrence of ignition. Thus to secure safety, the separator is demanded to have a higher degree of heat resistance than the degree of heat resistance to be obtained by the present SD property.

To comply with the above-described demand, there are proposed in the following patent documents 1, 2, and 3 the multilayer porous films each having the porous layer, containing the filler and the resin binder, which is laminated on at least one surface of porous polyolefin resin film. It is described in these patent documents that the methods of producing the multilayer porous films are excellent in safety because in these multilayer porous films, by forming the coating layer containing the inorganic filler or the like at a high content rate on the porous film, it is possible to prevent the occurrence of a short circuit between the positive and negative electrodes, even though abnormal heat is generated and the temperature of a battery continues to rise over the SD temperature.

PRIOR ART DOCUMENT

Patent Document

Patent document 1: Japanese Patent Application Laid-Open No. 2004-227972
Patent document 2: Japanese Patent Application Laid-Open No. 2007-280911
Patent document 3: Japanese Patent Application Laid-Open No. 2008-186721

SUMMARY OF THE INVENTION

Problems to be Solved by the Invention

In the production methods described in the patent documents 1 through 3, to secure a high air permeable property, it is necessary to decrease the content of the resin binder and increase the particle diameter of the filler. But the production methods have a problem that when fillers having a large particle diameter are used, a binding force between the fillers deteriorates and thus the fillers are liable to fall off.

To solve the above-described problems, it is an object of the present invention to provide a multilayer porous film which has a high binding force between fillers and excellent heat resistance and is thus capable of displaying excellent SD property when the multilayer porous film is used as a separator for a nonaqueous electrolytic solution secondary battery.

Means for Solving the Problem

The present invention provides a multilayer porous film composed of a coating layer, containing a filler and a resin binder, which is laminated on at least one surface of a porous polyolefin resin film composing a base layer, wherein a ratio of an average particle diameter (Du) of the filler which is disposed downward from an upper surface of the coating layer composing an upper surface of the multilayer porous film and has a thickness within 25% of a thickness of the coating layer to an average particle diameter (Db) of the filler which is disposed upward from an interface between the coating layer and the base layer and has a thickness within 25% of the thickness of the coating layer, namely (Db/Du) is set to 1.2 to 10; and the average particle diameter (Du) of the filler disposed at an upper surface side of the coating layer is set to not more than 0.5 μm.

It is preferable that the average particle diameter of the filler contained in the entire coating layer is set to not less than 0.1 μm nor more than 3.0 μm.

It is preferable that the average particle diameter (Du) of the filler is set to 0.05 μm to 0.5 μm; the average particle diameter (Db) of the filler is set to 0.1 μm to 3.0 μm; an average particle diameter of the filler disposed in a region intermediate between the filler which is disposed downward from the upper surface of the coating layer and has a thickness within 25% of the thickness of the coating layer and the filler which is disposed upward from the interface between the coating layer and the base layer and has a thickness within 25% of the thickness of the coating layer is located between the average particle diameter (Du) and the average particle diameter (Db); and the average particle diameter of the filler of the coating layer increases from the upper surface of the coating layer to the interface between the coating layer and the base layer.

It is preferable that a density of the filler is set to not less than twice as high as that of the resin binder.

It is preferable that the porous polyolefin resin film composing the base layer has at least one layer containing polypropylene resin as a main component thereof.

It is possible to form the porous polyolefin resin film composing the base layer by laminating a layer (layer A) containing polypropylene resin as a main component thereof, a porous layer (layer B) consisting of other polyolefin resin such as polyethylene resin or/and a porous layer consisting of resin other than the polyolefin one upon another, and thereafter laminate the coating layer on a surface of the porous polyolefin resin film formed by laminating the above-described layers one upon another.

It is preferable that the porous polyolefin resin film composing the base layer has a β crystal activity.

It is preferable to set peel-off strength between the base layer and the coating layer to not less than 3N/15 mm.

It is preferable to set a thermal contraction rate of the multilayer porous film composed of the base layer and the coating layer laminated thereon to less than 25% at 150° C.

The present invention provides a separator, for a nonaqueous electrolytic solution secondary battery, consisting of the multilayer porous film.

The present invention also provides a nonaqueous electrolytic solution secondary battery using the separator therefor.

The present invention provides a method of producing a multilayer porous film, wherein a dispersion solution in which the filler and the resin binder are dissolved or dispersed in a solvent is applied to at least one surface of the porous polyolefin resin film to compose the base layer; and the filler is settled toward the base layer before a step of removing the solvent is performed or while the step of removing the solvent is being performed to set a ratio of the average particle diameter (Db) of the filler to the average particle diameter (Du) thereof (Db/Du) to 1.2 to 10 from the upper surface of the coating layer toward the base layer in a thickness direction of the coating layer.

The present invention also provides another method of producing the multilayer porous film, wherein dispersion solutions containing the filler having different average particle diameters are applied to at least one surface of a porous polyolefin resin film composing the base layer at a plurality of times in such a way that the dispersion solution containing the filler having a large average particle diameter is applied to the surface of the porous polyolefin resin film earlier than the dispersion solution containing the filler having a small average particle diameter by layering the latter dispersion solution on the former dispersion solution to set the ratio of the average particle diameter (Db) of the filler to the average particle diameter (Du) thereof (Db/Du) to 1.2 to 10 from the upper surface of the coating layer toward the base layer in a thickness direction of the coating layer.

It is preferable to heat-treat the multilayer porous film at not less than 100° C. nor more than 170° C. before the dispersion solution is applied to the base layer or after the coating layer is formed on the base layer and thereafter subject the multilayer porous film to relaxation treatment at 1 to 20%, while the multilayer porous film is being heat-treated to set a thermal contraction rate thereof at 150° C. to less than 25%.

Effect of the Invention

According to the present invention, in the coating layer laminated on the surface of the porous polyolefin resin film composing the base layer, the average particle diameter of the filler is set smaller from the interface between the base layer and the coating toward the upper surface of the coating layer. In this manner, the average particle diameter of the filler disposed at the upper surface side of the coating layer is set smaller than that of the filler disposed at the interface side to form a fine structure at the upper surface side thereof. Therefore it is possible to enhance the binding force between fillers disposed at the upper surface side of the coating layer and prevent the filler from falling from the base layer side of the coating layer. On the other hand, because the average particle diameter of the filler disposed at the base layer side of the coating layer is set larger than that of the filler disposed at the upper surface side thereof, the base layer side of the coating layer has a structure having a high aeration property and is thus capable of restraining the aeration property from deteriorating. In addition, the multilayer porous film of the present invention is excellent in its resistance to thermal contraction. The thermal contraction rate thereof is set low, namely, less than 25%. Thus the multilayer porous film has excellent SD property. By differentiating the average particle diameter of the filler in the thickness direction of the coating layer, as described above, fall-off of the filler of the coating layer is restrained and a high degree of adhesion can be securely obtained between the coating layer and the base layer. Thus in the case where the multilayer porous film of the present invention is used as the separator for the nonaqueous electrolytic solution secondary battery such as the lithium-ion secondary battery, the multilayer porous film displays superior properties.

MODE FOR CARRYING OUT THE INVENTION

Figure 1:
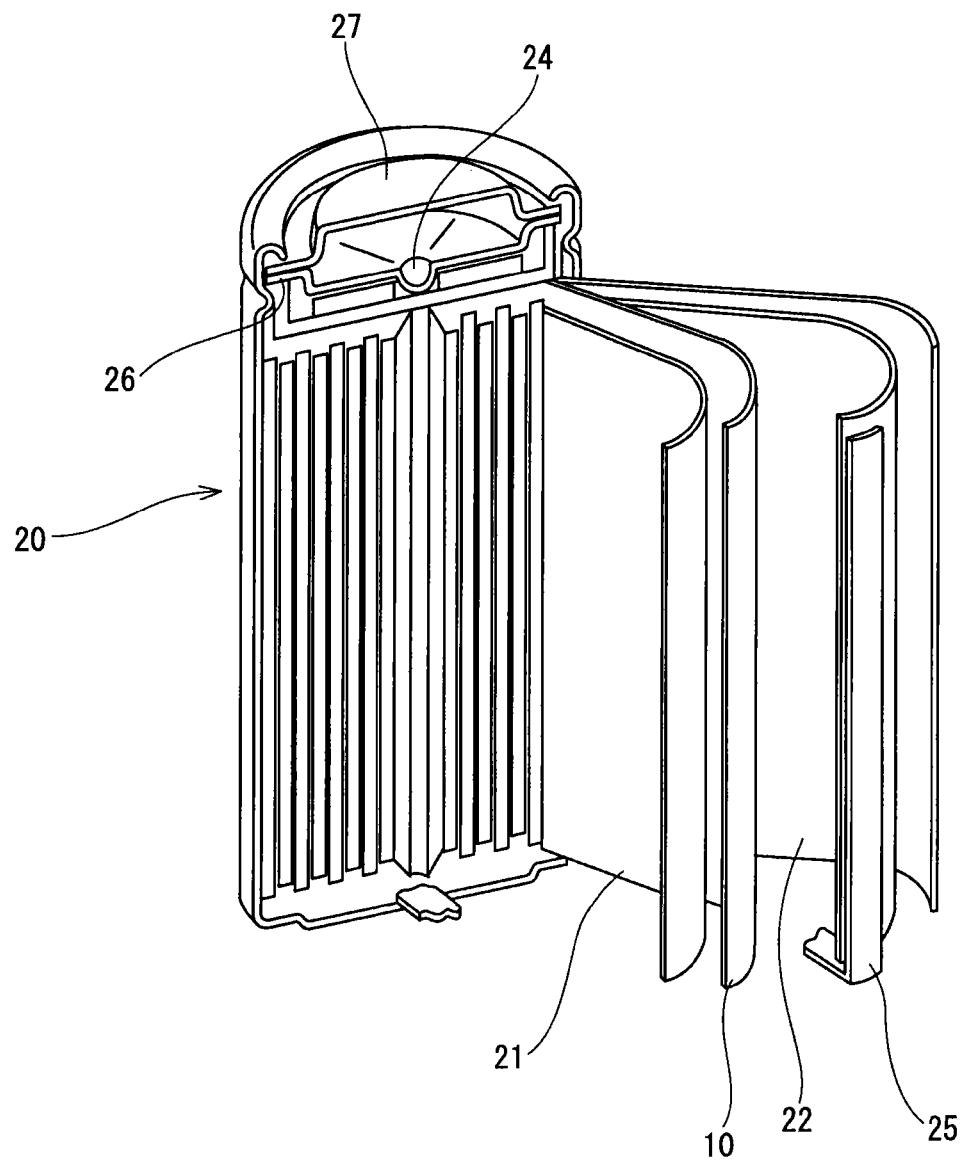
FIG. 1 is a schematic sectional view of a battery accommodating a multilayer porous film of the present invention.

The embodiments of the multilayer porous film of the present invention are described in detail below.

In the present invention, unless specifically described, the expression of "main component" includes a case in which a resin composition contains components other than the main component in a range where the function of the main component is not inhibited. Although the content rate of the main component is not specified, the expression of "main component" also means that the main component is contained in the resin composition at not less than 50 mass %, favorably not less than 70 mass %, and especially favorably not less than 90 mass % (including 100%).

Unless otherwise described, the description of "X to Y" (X, Y are any numerals) means "not less than X nor more than Y" and also includes meaning "preferably larger than X" and "preferably smaller than Y".

Each of components composing the multilayer porous film of the present invention is described below.

Porous Polyolefin Resin Film Forming Base Layer (Layer I)

As the polyolefin resin to be used for the porous polyolefin resin film, homopolymers or copolymers formed by polymerizing ethylene, propylene, 1-butene, 4-methyl-1-pentene, 1-hexene, and the like are listed. Of these polyolefin resins, the polypropylene resin and the polyethylene resin are preferable.

Polypropylene Resin

As the polypropylene resin, homo-polypropylene (propylene homopolymer) and random copolymers or block copolymers consisting of propylene and α-olefin such as ethylene, 1-butene, 1-pentene, 1-hexene, 1-heptene, 1-octene, 1-nonen or 1-decene are listed. Of the above-described polypropylene resins, the homo-polypropylene is used more favorably from the standpoint that it is capable of maintaining the mechanical strength and heat resistance of the multilayer porous film.

It is favorable to use the polypropylene resin in which an isotactic pentad fraction (mmmm fraction) showing tacticity is 80 to 99%. It is more favorable to use the polypropylene resin in which the isotactic structure pentad fraction is 83 to 98% and most favorable to use the polypropylene resin in which the isotactic structure pentad fraction at 85 to 97%. When the isotactic pentad fraction is too low, there is a fear that the mechanical strength of the film is low. On the other hand, the upper limit of the isotactic pentad fraction is specified by the upper limit value industrially obtained at the present time. But in the case where a resin having a higher regularity at an industrial level is developed in the future, there is a possibility that the upper limit of the isotactic pentad fraction is altered.

The isotactic pentad fraction (mmmm fraction) means a three-dimensional structure in which all of five methyl groups which are side chains branched from a main chain consisting of a carbon-carbon bond composed of arbitrary continuous five propylene units are positioned in the same direction with respect to the main chain or the ratio of the side chains positioned in the same direction with respect to the main chain. The attribution of a signal in a methyl group region complies with A. Zambelli et al (Marcomolecules 8, 687, (1975)).

It is favorable that Mw/Mn which is a parameter showing the molecular-weight distribution of the polypropylene resin is 2.0 to 10.0. It is more favorable to use the polypropylene resin having the Mw/Mn of 2.0 to 8.0 and most favorable to use the polypropylene resin having the Mw/Mn of 2.0 to 6.0. The smaller is the Mw/Mn, the narrower is the molecular-weight distribution. When the Mw/Mn is less than 2.0, there occurs a problem that extrusion moldability is low, and in addition it is difficult to industrially produce the polypropylene resin. On the other hand, when the Mw/Mn exceeds 10.0, the amount of a low molecular-weight component becomes large. Thereby the mechanical strength of the multilayer porous film is liable to be low. The Mw/Mn is obtained by a GPC (gel permeation chromatography) method.

Although the melt flow rate (MFR) of the polypropylene resin is not limited to a specific value, normally, the MFR thereof is set to favorably 0.5 to 15 g/10 minutes and more favorably 1.0 to 10 g/10 minutes. By setting the MFR to not less than 0.5 g/10 minutes, the melt viscosity of the resin is high at a molding processing time and thus a sufficient productivity can be securely obtained. On the other hand, by setting the MFR to not more than 15 g/10 minutes, it is possible to sufficiently hold the mechanical strength of the multilayer porous film to be obtained. The MFR is measured in accordance with JIS K7210 in a condition where temperature is 230° C. and a load is 2.16 kg.

The method of producing the polypropylene resin is not limited to a specific one, but it is possible to exemplify known polymerization methods in which a known polymerization catalyst is used. For example, a multi-site catalyst represented by a Ziegler-Natta type catalyst and a single-site catalyst represented by a Metallocene catalyst are exemplified.

As the polypropylene resin, it is possible to use commercially available products having the following trade names: such as "Novatec PP" and "WINTEC" (produced by Japan Polypropylene Corporation), "Notio", "TAFMER XR" (produced by Mitsui Chemicals, Inc.), "Zerasu" and "Thermorun" (produced by Mitsubishi Chemical Corporation), "Sumitomo NOBLEN" and "Toughseren" (produced by Sumitomo Chemical Co., Ltd.), "Prime TPO" (produced by Prime Polymer Corporation), "AdfleX", "Adsyl", and "HMS-PP (PF814)" (produced by SunAllomer Ltd.), and "VERSIFY" and "Inspire" (produced by Dow Chemical Company).

It is preferable that the multilayer porous film of the present invention has a "β crystal activity".

The β crystal activity can be considered as an index indicating that the polypropylene resin of a membrane material has generated a β crystal before the membrane material is stretched. When the polypropylene resin of the membrane material generates the β crystal before the membrane material is stretched, micropores are formed by stretching the membrane material even in the case where an additive such as a filler is not used. Thereby it is possible to obtain the multilayer porous film having an air-permeable property.

In the multilayer porous film of the present invention, as to whether the multilayer porous film has the "β crystal activity", when a crystal melting peak temperature derived from the β crystal is detected by a differential scanning calorimeter to be described later and/or when a diffraction peak derived from the β crystal is detected by measurement to be made by using an X-ray diffraction measuring apparatus to be described later, it is determined that the multilayer porous film has the "β crystal activity".

More specifically, after the temperature of the multilayer porous film is raised from 25° C. to 240° C. at a heating speed of 10° C./minute, the multilayer porous film is allowed to stand for one minute. After the temperature of the multilayer porous film is dropped from 240° C. to 25° C. at a cooling speed of 10° C./minute, the multilayer porous film is allowed to stand for one minute. Thereafter the temperature of the multilayer porous film is raised again from 25° C. to 240° C. at the heating speed of 10° C./minute. In the case where the crystal melting peak temperature (Tmβ) derived from the β crystal of the polypropylene resin is detected by the differential scanning calorimeter at this time, it is determined that the multilayer porous film has the β crystal activity.

The β crystal activity degree of the multilayer porous film is computed based on an equation shown below by using a detected crystal melting heat amount (ΔHmα) derived from an α crystal of the polypropylene resin and a detected crystal melting heat amount (ΔHmβ) derived from the β crystal thereof.

β crystal activity degree(%)=[ΔHmβ/(ΔHmβ+ ΔHmα)]×100

For example, in the case where the polypropylene resin is homopropylene, the β crystal activity degree can be computed from the crystal melting heat amount (ΔHmβ), derived from the β crystal, which is detected mainly in a range not less than 145° C. and less than 160° C. and from the crystal melting heat amount (ΔHmα), derived from the α crystal, which is detected mainly in a range not less than 160° C. nor more than 170° C. In the case of random polypropylene in which 1 to 4 mol % of ethylene is copolymerized with propylene, the β crystal activity degree can be computed from the β crystal melting heat amount (ΔHmβ), derived from the β crystal, which is detected mainly in a range not less than 120° C. and less than 140° C. and from the crystal melting heat amount (ΔHmα), derived from the α crystal, which is detected mainly in a range not less than 140° C. nor more than 165° C.

It is preferable that the β crystal activity degree of the multilayer porous film is as high as possible. The β crystal activity degree is favorably not less than 20%, more favorably not less than 40%, and especially favorably not less than 60%. When the multilayer porous film has the β crystal activity degree not less than 20%, it shows that the β crystal can be generated in an unstretched membrane material and that many pores fine and homogeneous can be formed by stretching the unstretched membrane material. Consequently the multilayer porous film can be used as a separator for a non-aqueous electrolytic solution secondary battery having a high mechanical strength and an excellent air-permeable performance. The upper limit value of the β crystal activity degree is not limited to a specific value. But the higher is the β crystal activity degree, the more effectively the above-described effect can be obtained. Therefore it is preferable that the upper limit of the β crystal activity degree is as close as to 100%.

Whether the multilayer porous film has the β crystal activity can be also determined based on a diffraction profile to be obtained by conducting wide-angle X-ray diffraction measurement of the multilayer porous film subjected to specific heat treatment.

In detail, after the multilayer porous film is thermally treated at 170° C. to 190° C. higher than the melting point of the polypropylene resin, the multilayer porous film in which the β crystal has been generated and grown is gradually cooled to carry out the wide-angle X-ray measurement. When a diffraction peak derived from a (300) plane of the β crystal of the polypropylene resin is detected in a range of 2θ=16.0° to 16.5°, it is determined that the multilayer porous film has the β crystal activity.

Regarding the detail of the β crystal structure of the polypropylene resin and the wide-angle X-ray diffraction, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and reference documents listed in these documents. The method of evaluating the β crystal activity by using the wide-angle X-ray diffraction is shown in detail in the examples of the present invention to be described later.

The β crystal activity can be measured both in the case where the multilayer porous film has a single-layer structure and in the case where the multilayer porous film has a plurality of porous layers laminated one upon another.

It is preferable that in the case where a layer containing the polypropylene resin is laminated on the layer consisting of the polypropylene resin, both layers have the β crystal activity.

As methods of obtaining the β crystal activity, the method of adding polypropylene treated to generate the peroxide radical to the resin composition, as described in Japanese Patent No. 3739481 and the method of adding a β crystal nucleating agent to the resin composition are exemplified.

β Crystal Nucleating Agent

As the β crystal nucleating agent to be used in the present invention, those shown below are listed. It is possible to use any of the β crystal nucleating agents which increase the generation and growth of the β crystal of the polypropylene resin. The β crystal nucleating agents may be used by mixing not less than two kinds thereof with each other.

As the β crystal nucleating agent, it is possible to list amide compounds; tetraoxaspiro compounds; quinacridones; iron oxides having a nano-scale size; alkaline metal salts or alkaline earth metal salts of carboxylic acid represented by 1,2-potassium hydroxystearate, magnesium benzoate, magnesium succinate, and magnesium phthalate; aromatic sulfonic acid compounds represented by sodium benzensulfonate and sodium naphthalene sulfonate; diesters or triesters of dibasic or tribasic carboxylic acid; phthalocyanine-based pigments represented by phthalocyanine blue; two-component compounds composed of a component A which is an organic dibasic acid and a component B which is an oxide, a hydroxide or a salt of the IIA group metals of the Periodic Table; and compositions consisting of a cyclic phosphorous compound and a magnesium compound. Other kinds of the β crystal nucleating agent are described in Japanese Patent Application Laid-Open Nos. 2003-306585, 08-144122, and 09-194650.

As examples of the β crystal nucleating agent commercially available, "Enujesuta-NU-100" produced by New Japan Chemical Co., Ltd. is exemplified. As examples of the polypropylene resin to which the β crystal nucleating agent has been added, it is possible to list Polypropylene "Bepol B-022SP" produced by Aristech Inc., Polypropylene "Beta (β)-PP BE60-7032" produced by Borealis Inc., and Polypropylene "BNX BETAPP-LN" produced by Mayzo Inc. are listed.

It is necessary to appropriately adjust the mixing ratio of the β crystal nucleating agent to be added to the polypropylene resin according to the kind of the β crystal nucleating agent and the composition of the polypropylene resin. It is favorable to add 0.0001 to 5.0 parts by mass of the β crystal nucleating agent, more favorable to add 0.001 to 3.0 parts by mass thereof, and most favorable to add 0.01 to 1.0 part by mass thereof to 100 parts by mass of the polypropylene resin. When the mixing ratio of the β crystal nucleating agent is not less than 0.0001 parts by mass, it is possible to generate and grow the β crystal activity sufficiently at a production time, secure the β crystal activity sufficiently in using the multilayer porous film as the separator for the battery, and thus obtain desired air-permeable performance. When not more than 5.0 parts by mass of the β crystal nucleating agent is added to the polypropylene resin, economic advantage is obtained, and in addition, the β crystal nucleating agent does not bleed to the surface of the multilayer porous film, which is preferable.

In the case where a layer containing the polypropylene resin is layered on the layer consisting of the polypropylene resin, the amounts of the β crystal nucleating agent to be contained in the layers may be equal to each other or different from each other. By altering the addition amount of the β crystal nucleating agent, the porous structure of each layer can be appropriately adjusted.

Other Components

In the present invention, in addition to the above-described components, additives to be normally contained in the resin composition may be appropriately added to the polypropylene resin in a range in which they do not outstandingly inhibit the effect of the present invention. The additives are added to the polypropylene resin to improve and adjust molding processability, productivity, and various properties of the porous polyolefin resin film (layer I). It is possible to list recycle resin which is generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, a plasticizer, an age resistor, an antioxidant, a light stabilizer, an ultraviolet ray absorber, a neutralizing agent, an antifog agent, an anti-blocking agent, a slip agent, and a coloring agent.

Polyethylene Resin

As the polyethylene resin, it is possible to list homopolymer polyethylene such as ultra-low-density polyethylene, low-density polyethylene, high-density polyethylene, linear low-density polyethylene, and ultra-high-molecular-weight polyethylene characteristic in its molecular weight and in addition, an ethylene-propylene copolymer, and copolymer polyethylene of the polyethylene resin and other polyolefin resins. Of these polyethylene resins, the homopolymer polyethylene and the copolymer polyethylene containing not more than 2 mol % of an α-olefin comonomer are favorable. The homopolymer polyethylene is more favorable. The kind of the α-olefin comonomer is not limited to a specific one.

The density of the polyethylene resin is set to favorably 0.910 to 0.970 g/cm$^3$, more favorably 0.930 to 0.970 g/cm$^3$, and most favorably 0.940 to 0.970 g/cm$^3$. When the density thereof is not less than 0.910 g/cm$^3$, the polyethylene resin is capable of having a proper SD property, which is preferable. When the density thereof is not more than 0.970 g/cm$^3$, the polyethylene resin is capable of having the proper SD property, and in addition stretch property thereof is maintained, which is preferable.

The density thereof can be measured in accordance with JIS K7112 by using a density gradient tube method.

Although the melt flow rate (MFR) of the polyethylene resin is not specifically limited, MFR thereof is favorably 0.03 to 30 g/10 minutes and more favorably 0.3 to 10 g/10 minutes. When the MFR is not less than 0.03 g/10 minutes, the melt viscosity of the resin is sufficiently low at a molding processing time, and thus productivity is excellent, which is preferable. On the other hand, when the MFR is not more than 30 g/10 minutes, the polyethylene resin is capable of obtaining a sufficient mechanical strength, which is preferable.

The MFR is measured in accordance with JIS K7210 in the condition where temperature is 190° C. and a load is 2.16 kg.

The catalyst for polymerizing the polyethylene resin is not limited to a specific kind, but it is possible to use any of a Ziegler-Natta type catalyst, a Phillips type catalyst, and a Kaminski type catalyst. As methods of polymerizing the polyethylene resin, it is possible to use one-step polymerization, two-step polymerization, and multi-step polymerization. It is possible to use the polyethylene resin formed by any of the above-described methods.

Porousness Acceleration Compound

It is preferable to add a porousness acceleration compound X which accelerates porousness to the polyethylene resin. By adding the porousness acceleration compound X to the polyethylene resin, it is possible to effectively obtain a porous structure and easily control the configuration and diameter of micropores.

The kind of the porousness acceleration compound X is not limited to specific kinds. Modified polyolefin resin, alicyclic saturated hydrocarbon resin, modified substances thereof, ethylene copolymers, and wax are exemplified. It is favorable that the polyethylene resin contains at least one kind selected from among the above-described porousness acceleration compounds X. Of these porousness acceleration compounds X, the alicyclic saturated hydrocarbon resin, the modified substances thereof, the ethylene copolymers, and the wax having a high effect for achieving porousness are favorable. The wax is more favorable from the standpoint of moldability.

As the alicyclic saturated hydrocarbon resin and the modified substances thereof, petroleum resin, rosin resin, terpene resin, coumarone resin, indene resin, coumarone-indene resin, and modified substances thereof are listed.

In the present invention, the petroleum resin means aliphatic, aromatic, and copolymerization petroleum resins to be obtained by homo-polymerization or copolymerization of one or not less than two kinds of aliphatic olefins and diolefins having C4 to C10 to be obtained from side products resulting from thermal decomposition of naphtha and of aromatic compounds which have not less than C8 and olefinic unsaturated bonds.

The petroleum resin includes aliphatic petroleum resin whose main raw material is C5 fraction, aromatic petroleum resin whose main raw material is C9 fraction, copolymerization petroleum resin of the aliphatic petroleum resin and the aromatic petroleum resin, and alicyclic petroleum resin. As the terpene resin, it is possible to exemplify terpene resin and terpene-phenol resin to be obtained from β-pinene. As the rosin resin, it is possible to exemplify rosin resin such as gum rosin, wood rosin, and the like and esterified rosin resin modified with glycerin or pentaerythritol. When alicyclic saturated hydrocarbon resin and modified substances thereof are mixed with the polyethylene resin, they show a comparatively favorable compatibility with the polyethylene resin. The petroleum resin is more favorable from the standpoint of color and thermal stability. To use the hydrogenated petroleum resin is more favorable.

The hydrogenated petroleum resin is obtained by hydrogenating the petroleum resin by conventional methods. For example, hydrogenated aliphatic petroleum resin, hydrogenated aromatic petroleum resin, hydrogenated copolymerization petroleum resin, hydrogenated alicyclic petroleum resin, and hydrogenated terpene resin are listed. Of the hydrogenated petroleum resin, the hydrogenated alicyclic petroleum resin obtained by copolymerizing a cyclopentadiene compound and an aromatic vinyl compound with each other is especially preferable. As the hydrogenated petroleum resin commercially available, "Archon" (produced by Arakawa Chemical Industries, Ltd.) is exemplified.

In the present invention, the ethylene copolymers mean compounds obtained by copolymerizing ethylene with not less than one kind selected from among vinyl acetate, unsaturated carboxylic acid, unsaturated carboxylic acid anhydride, and carboxylic acid ester.

In the ethylene copolymer, the content rate of an ethylene monomer unit is favorably not less than 50 parts by mass, more favorably not less than 60 parts by mass, and most favorably not less than 65 parts by mass. The upper limit of the content rate of the ethylene monomer unit is favorably not more than 95 parts by mass, more favorably not more than 90 parts by mass, and most favorably not more than 85 parts by mass. When the content rate of the ethylene monomer unit is within the predetermined range, it is possible to form the porous structure more efficiently.

The ethylene copolymer having the MFR (JIS K7210, temperature: 190° C., load: 2.16 kg) not less than 0.1 g/10 minutes nor more than 10 g/10 minutes is preferably used. When the MFR is not less than 0.1 g/10 minutes, extrusion processability can be favorably maintained. On the other hand, when the MFR is not more than 10 g/10 minutes, the strength of the film is unlikely to deteriorate, which is preferable.

The ethylene copolymers shown below can be commercially obtained. As an ethylene-vinyl acetate copolymer, "EVAFLEX" (produced by Dupont-Mitsui Polychemicals Co., Ltd.) and "Novatec EVA" (produced by Japan Polyethylene Corporation) are exemplified. As an ethylene-acrylic acid copolymer, "NUC copolymer" (produced by Nippon Unicar Co., Ltd.), "EVAFLEX-EAA" (produced by Dupont-Mitsui Polychemicals Co., Ltd.), "REXPEARL EAA" (produced by Japan Ethylene Corporation) are exemplified. As an ethylene-(metha)acrylate copolymer, "ELVALOY" (produced by Dupont-Mitsui Polychemicals Co., Ltd.) and "REXPEARL EMA" (produced by Japan Ethylene Corporation) are exemplified. As an ethylene-ethyl acrylate copolymer, "REXPEARL EEA" (produced by Japan Ethylene Corporation) is exemplified. As an ethylene-methyl(metha) acrylate copolymer, "Acryft" (produced by Sumitomo Chemical Co., Ltd.) is exemplified. As an ethylene-vinyl acetate-maleic anhydride terpolymer, "Bondine" (produced by Sumitomo Chemical Co., Ltd.) is exemplified. As an ethylene-glycidyl methacrylate copolymer, an ethylene-vinyl acetate-glycidyl methacrylate terpolymer, and an ethyl-ethyl acrylate-glycidyl methacrylate terpolymer, "Bondfast" (produced by Sumitomo Chemical Co., Ltd.) is exemplified.

In the present invention, the wax is an organic compound satisfying the properties of the following (a) and (b).

(a) Melting point is 40° C. to 200° C.
(b) Melt viscosity at temperatures higher than the melting point by 10° C. is not more than 50 Pa·s.

The wax includes polar wax or nonpolar wax, polypropylene wax, polyethylene wax, and wax modifier. More specifically, it is possible to list the polar wax, the nonpolar wax, Fischer-Tropsh wax, oxidized Fischer-Tropsh wax, hydroxysteroid wax, functionalized wax, the polypropylene wax, the polyethylene wax, the wax modifier, amorphous wax, caster oil wax, microcrystalline wax, beeswax, castor wax, vegetable wax, candelilla wax, Japan wax, ouricury wax, Douglas-fir Bark wax, rice bran wax, jojoba wax, bayberry wax, montan wax, ozokerite wax, ceresin wax, petroleum wax, paraffin wax, chemically modified hydrocarbon wax, substituted amide wax, combinations of these waxes, and derivatives thereof. Of these waxes, the paraffin wax, the polyethylene wax, and the microcrystalline wax are favorable because these waxes allow the porous structure to be formed efficiently. From the standpoint of the SD property, the microcrystalline wax which allows pore diameters to be small is more favorable. As the polyethylene wax commercially available, "FT-115" (produced by Nippon Seiro Co., Ltd.) is exemplified. As the microcrystalline wax commercially available, "Hi-Mic" (produced by Nippon Seiro Co., Ltd.) is exemplified.

In forming micropores by peeling the interface between the polyethylene resin and the porousness acceleration compound X, the lower limit of the mixing amount of the porousness acceleration compound X for 100 parts by mass of the polyethylene resin contained in one layer is favorably not less than one part by mass, more favorably not less than five parts by mass, and most favorably not less than 10 parts by mass. On the other hand, as the upper limit of the mixing amount of the porousness acceleration compound X, the mixing amount thereof is favorably not more than 50 parts by mass, more favorably not more than 40 parts by mass, and most favorably not more than 30 parts by mass. By setting the mixing amount of the porousness acceleration compound X for 100 parts by mass of the polyethylene resin to not less than one part by mass, it is possible to obtain a sufficient effect of generating an intended favorable porous structure. By setting the mixing amount of the porousness acceleration compound X for 100 parts by mass of the polyethylene resin to not more than 50 parts by mass, it is possible to secure a more stable moldability.

In addition to the polyethylene resin and the porousness acceleration compound X, as necessary, thermoplastic resin may be used in a range where the thermal property of the porous film, specifically, porousness is not inhibited. As other thermoplastic resins which can be mixed with the polyethylene resin, styrene resin such as polystyrene, AS resin, and ABS resin; ester resin such as polyvinyl chloride, fluororesin, polyethylene terephthalate, polybutylene terephthalate, polycarbonate, and polyarylate; ether resin such as polyacetal, polyphenylene ether, polysulfone, polyether sulfone, polyether ether ketone, and polyphenylene sulfide; and polyamide resin such as nylon 6, nylon 6-6, and nylon 6-12 are listed.

A rubber component such as a thermoplastic elastomer may be added to the polyethylene resin as necessary. As the thermoplastic elastomer, styrene butadiene elastomer, polyolefin elastomer, urethane elastomer, polyester elastomer, polyamide elastomer, 1,2-polybutadiene elastomer, polyvinyl chloride elastomer, and ionomer elastomer are listed.

In addition to the polyethylene resin and the porousness acceleration compound X, the resin composition may contain additives or other components to be normally contained therein. The additives are used to improve and adjust molding processability, productivity, and various properties of the porous polyolefin resin film (layer I). It is possible to list recycle resin generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, a plasticizer, an age resistor, an antioxidant, a light stabilizer, an ultraviolet ray absorber, a neutralizing agent, an antifog agent, an anti-blocking agent, a slip agent, and a coloring agent.

Of the above-described additives, the nucleating agent is preferable because it has the effect of controlling the crystal structure of the polyethylene resin and making the porous structure fine when the unporous membrane material is stretched to form micropores therein. As examples of the nucleating agent commercially available, "Gelall D" (produced by New Japan Science Ltd.), "ADEKA STAB" (produced by Asahi Denka Co., Ltd.), "Hyperform" (produced by Milliken & Company), and "IRGACLEAR D" (produced by Chiba Specialty Chemicals, Inc.) are listed. As an example of the polyethylene resin to which the nucleating agent has been added, "Rikemaster" (produced by Riken Vitamin Co., Ltd.) and the like are commercially available.

Layer Structure of Porous Polyolefin Resin Film (Layer I)

In the present invention, the porous polyolefin resin film (layer I) may be composed of a single layer or a plurality of layers laminated one upon another. But it is favorable to compose the porous polyolefin resin film of not less than two layers laminated one upon another. It is more favorable to compose the porous polyolefin resin film of a layer containing the polypropylene resin and a layer containing the polyethylene resin laminated thereon.

The layer structure of the porous polyolefin resin film is not limited to a specific one, provided that at least one layer containing the polypropylene resin (hereinafter referred to as "layer A") is present in the porous polyolefin resin film. Other layer (hereinafter referred to as "layer B") can be laminated on the layer A within the range in which the layer B does not inhibit the function of the porous polyolefin resin film. The substance composing the layer B to be laminated on the layer A is not limited to the polyolefin resin, but it is preferable to laminate the layer B on the layer A by forming the layer B as a function layer, for example, a strength-holding layer, a heat-resistant layer (high-melting temperature resin layer) or a shut-down layer (low-melting temperature resin layer). For example, in the case where the porous polyolefin resin film is used as the separator for the lithium-ion battery, as described in Japanese Patent Application Laid-Open Publication No. 04-181651, it is preferable to laminate the low-melting temperature resin layer which closes pores in a high-temperature atmosphere and secures the safety of the battery on the layer A.

It is possible to exemplify a two-layer structure composed of the layer A/the layer B laminated one upon another and a three-layer structure composed of the layer A/the layer B/the layer A or the layer B/the layer A/the layer B laminated one upon another. It is also possible to form a three-kind three-layer structure by combining a layer having a function different from that of the layer A and that of the layer B with the layer A and the layer B. In this case, the order of layering the layer A, the layer B, and the layer having the function different from that of the layer A and that of the layer B one upon another is not limited to a specific one. It is also possible to increase the number of layers to four layers, five layers, six layers, and seven layers as necessary.

The properties of the porous polyolefin resin film of the present invention can be freely adjusted according to a layer structure, a lamination ratio, the composition of each layer, and a production method.

Method of Producing Base Layer (Layer I)

The method of producing the base layer (layer I) consisting of the porous polyolefin resin film is described below. But the present invention is not limited to the porous polyolefin resin film (layer I) to be produced by the production method described below.

The method of producing the unporous membrane material is not limited to a specific method, but known methods may be used. It is possible to exemplify a method of fusing the thermoplastic resin composition by using an extruder, extruding it from a T-die, and cooling it with a casting roll to solidify it. It is also possible to use a method of cutting open a membrane material produced by using a tubular method to make it planar.

The method of stretching the unporous membrane material includes a roll stretching method, a rolling method, a tenter stretching method, and a simultaneous biaxial stretching method. A uniaxial stretching or a biaxial stretching is performed by using one of the above-described methods or in combination of not less than two of the above-described methods. From the standpoint of the control of the porous structure, a sequential biaxial stretching is preferable.

In the case where the porous polyolefin resin film (layer I) is composed of a plurality of the base layers (layer I) laminated one upon another, the method of producing the porous polyolefin resin film is classified into the following four methods according to the order of the step at which the unporous membrane material is made porous and the step at which layers are laminated one upon another.

(I) A method of making respective layers composing the porous polyolefin resin film porous and thereafter laminating the layers which have been made porous one upon another by stacking them upon another or by bonding them to one another with an adhesive agent or the like.

(II) A method of forming a laminated unporous membrane material by laminating respective layers one upon another and thereafter making the unporous membrane material porous.

(III) A method of making one of layers porous, laminating the layer which has been made porous and the other layer one upon another, and making the other layer porous.

(IV) A method of forming porous layers and thereafter laminating the formed porous layers one upon another by applying inorganic or organic particles thereto or by evaporating metal particles thereto to form a multilayer porous film.

In the present invention, it is preferable to use the method (II) from the standpoint of the simplicity of its process and productivity. To secure adhesion between two layers, it is especially preferable to form the laminated unporous membrane material by co-extrusion and thereafter make it porous.

The method of producing the porous polyolefin resin film composing the base layer (layer I) is described in detail below.

Initially a mixed resin composition of the polypropylene resin, the thermoplastic resin, and additives is prepared. The thermoplastic resin and the additives are used as necessary. Materials such as the polypropylene resin, the β nucleating agent, and the additives to be used as desired are mixed with one another by using a Henschel mixer, a super mixer or a tumbler-type mixer. Alternatively all the components are put in a bag and mixed with one another by hand. After the components are fused and kneaded with a uniaxial extruder, a twin screw extruder or a kneader, a mixture is cut to obtain a pellet. It is preferable to use the twin screw extruder.

The pellet is supplied to the extruder and extruded from a co-extrusion mouthpiece of a T-die to form a membrane material. The kind of the T-die is not limited to a specific one. When the two-kind three-layer structure is adopted for the multilayer porous film of the present invention, it is possible to use both a multi-manifold type for the two-kind three-layer structure and a feed block type for the two-kind three-layer structure.

Although the gap of the T-die to be used is determined according to an ultimately necessary thickness of a film, a stretching condition, a draft ratio, and various conditions, the gap of the T-die is set to normally 0.1 to 3.0 mm and favorably 0.5 to 1.0 mm. It is unpreferable to set the gap of the T-die to less than 0.1 mm from the standpoint of a production speed. When the gap of the T-die is more than 3.0 mm, the draft ratio becomes large, which is not preferable from the standpoint of stability in the production of the film.

Although the extrusion processing temperature in the extrusion molding is appropriately adjusted according to the flow property of the resin composition and the moldability thereof, the extrusion processing temperature is set to favorably 180 to 350° C., more favorably 200 to 330° C., and most favorably 220 to 300° C. When the extrusion processing temperature is not less than 180° C., the fused resin has a sufficiently low viscosity and thus excellent moldability and improved productivity. On the other hand, by setting the extrusion processing temperature to not more than 350° C., it is possible to restrain the resin composition from deteriorating and thus the mechanical strength of the multilayer porous film to be obtained from lowering.

The temperature at which the resin composition is cooled to solidify it by using the casting roll is very important in the present invention. The ratio of the β crystal of the polypropylene resin contained in the membrane material can be adjusted. The temperature at which the resin composition is cooled to solidify it by means of the casting roll is set to favorably 80 to 150° C., more favorably 90 to 140° C., and most favorably 100 to 130° C. By setting the temperature at which the resin composition is cooled to solidify it to not less than 80° C., the ratio of the β crystal contained in the membrane material can be sufficiently increased, which is preferable. By setting the temperature at which the resin composition is cooled to solidify it to not more than 150° C., it is possible to restrain the occurrence of a trouble that extruded fused resin adheres to the casting roll and sticks thereto. Thus it is possible to efficiently process the resin composition into the membrane material, which is preferable.

By setting the temperature of the casting roll to the above-described temperature range, the ratio of the β crystal of the polypropylene resin of the unstretched membrane material is set to 30 to 100%, favorably 40 to 100%, more favorably 50 to 100%, and most favorably to 60 to 100%. By setting the ratio of the β crystal of the unstretched membrane material to not less than 30%, it is easy to make the unstretched membrane material porous by a stretching operation to be performed at a later step. Thereby it is possible to obtain the porous polyolefin resin film having an excellent air-permeable property.

By using the differential scanning calorimeter, the rate of the β crystal of the polypropylene resin of the unstretched membrane material is computed based on the following equation by using the detected crystal melting heat amount ($\Delta Hm\alpha$) derived from the α crystal of the polypropylene resin and the crystal melting heat amount ($\Delta Hm\beta$) derived from the β crystal, when the temperature of the membrane material is raised from 25° C. to 240° C. at a heating speed of 10° C./minute.

Rate(%) of β crystal=$[\Delta Hm\beta/(\Delta Hm\beta+\Delta Hm\alpha)]\times 100$ At the stretching step, the unporous membrane material may be uniaxially or biaxially stretched in a length direction thereof or in a width direction thereof.

It is more favorable to stretch the obtained unporous membrane material at least biaxially thereafter. In biaxially stretching the unporous membrane material, the simultaneous biaxial stretching or the sequential biaxial stretching may be performed. But the sequential biaxial stretching is more favorable than the simultaneous biaxial stretching because the sequential biaxial stretching allows stretching conditions (stretch ratio, temperature) to be easily selected at each stretching step and the porous structure to be easily controlled. The longitudinal direction of the membrane material and that of the film are called a "length direction", whereas a direction vertical to the longitudinal direction is called a "width direction". Stretching in the longitudinal direction is called "length-direction stretching", whereas stretching in the direction vertical to the longitudinal direction is called "width-direction stretching".

In the case where the sequential biaxial stretching is used, it is necessary to vary the stretching temperature according to the composition, crystal melting peak temperature, and crystallization degree of the resin composition to be used. The stretching temperature in the length-direction stretching is controlled in the range of favorably 0 to 130° C., more favorably 10 to 120° C., and most favorably 20 to 110° C. The length-direction stretch ratio is set to favorably 2 to 10 times, more favorably 3 to 8 times, and most favorably 4 to 7 times longer than the original length of the unporous membrane material. By performing the length-direction stretching within the above-described range, it is possible to restrain breakage at a stretching time and generate a proper starting point of pores.

On the other hand, the stretching temperature in the width-direction stretching is set to 100 to 160° C., favorably 110 to 150° C., and most favorably 120 to 140° C. The length-direction stretch ratio is set to favorably 1.2 to 10 times, more favorably 1.5 to 8 times, and most favorably 2 to 7 times longer than the original length of the unporous membrane material. By performing the width-direction stretching in the above-described range, it is possible to moderately enlarge the starting point of the pores formed by the length-direction stretching and generate a fine porous structure.

The stretching speed at the above-described stretching steps is set to favorably 500 to 12000%/minute, more favorably 1500 to 10000%/minute, and most favorably 2500 to 8000%/minute.

To improve the dimensional stability of the porous film obtained in the above-described manner, it is preferable to heat-treat it. In the heat treatment, by setting the heat treatment temperature to favorably not less than 100° C., more favorably not less than 120° C., and most favorably not less than 140° C., the effect of the dimensional stability can be expected. On the other hand, the heat treatment temperature is set to favorably not more than 170° C., more favorably not more than 165° C., and most favorably not more than 160° C. When the heat treatment temperature is not more than 170° C., the polypropylene resin is unlikely to be melted by the heat treatment and thus the porous structure can be maintained, which is preferable. Relaxation treatment may be performed at 1 to 20% as necessary while the heat treatment step is being performed. By uniformly cooling the porous film and winding it after it is heat-treated, the porous polyolefin resin film of the present invention is obtained.

Coating Layer (Layer II)

In the present invention, a coating layer (layer II) containing a filler (a) and a resin binder (b) is laminated on at least one surface of the porous polyolefin resin film composing the base layer (layer I). More specifically, the base layer may consist of the porous polyolefin resin film consisting of one layer or the porous polyolefin resin film consisting of a plurality of layers laminated one upon another. When the base layer (layer I) consists of a layer A and a layer B laminated one upon another, the coating layer (layer II) is not interposed at an interface between the layer A and the layer B.

Filler (a)

As the filler (a) to be used for the coating layer, an inorganic filler and an organic filler can be used. The filler (a) which can be used in the present invention is not limited to a specific kind.

As examples of the inorganic filler, carbonates such as calcium carbonate, magnesium carbonate, and barium carbonate; sulfates such as calcium sulfate, magnesium sulfate, barium sulfate; chlorides such as sodium chloride, calcium chloride, and magnesium chloride; oxides such as aluminum oxide, calcium oxide, magnesium oxide, zinc oxide, titanium oxide, and silica; and silicates such as talc, clay, and mica. Of these inorganic fillers, the barium sulfate and the aluminum oxide are preferable from the standpoint that the barium sulfate and the aluminum oxide are inactive in the case where the multilayer porous film is incorporated in the nonaqueous electrolytic solution secondary battery as the separator therefor.

As examples of the organic filler, it is possible to list thermoplastic resins such as ultra-high-molecular-weight polyethylene, polystyrene, polymethyl methacrylate, polycarbonate, polyethylene terephthalate, polybutylene terephthalate, polyphenylene sulfide, polysulfone, polyethersulfone, polyether ether ketone, polytetrafluoroethylene, polyimide, polyetherimide, melamine, benzoguanamin; and thermosetting resins. Of these organic fillers, crosslinked polystyrene is preferable from the standpoint that the crosslinked polystyrene is resistant to swelling by an electrolytic solution in the case where the multilayer porous film is used as the separator for the nonaqueous electrolytic solution secondary battery.

It is important to differentiate the particle diameter of the filler (a) to be used for the coating layer (layer II) in the thickness direction thereof. In this embodiment, "the average particle diameter of the filler" is measured in accordance with a method in which an SEM is used.

An average particle diameter (Du) of the filler (a) which is disposed downward from the upper surface of the multilayer porous film and has a thickness within 25% of the thickness of the coating layer (layer II) is differentiated from an average particle diameter (Db) of the filler (a) which is disposed upward from an interface between the coating layer (layer II) and the porous polyolefin resin film (layer I) and has a thickness within 25% of the thickness of the coating layer (layer II) in such a way that the average particle diameter (Du) of the filler (a) disposed at the side of the upper surface of the multilayer porous film is set small, whereas the average particle diameter (Db) of the filler (a) disposed at the side of the interface located opposite to the upper surface of the multilayer porous film in the thickness direction of the coating layer (layer II) is set large. In this manner, the average particle diameter of the filler (a) of the coating layer (layer II) is set gradually larger from the upper surface of the multilayer porous film to the interface.

As described above, by differentiating the average particle diameters (Db) and (Du) of the filler (a) from each other in the thickness direction of the coating layer (layer II), there are formed a coarse structure having a high aeration property is formed in the coating layer (layer II) at the side of the interface between the coating layer (layer II) and the base layer (layer I) and a fine structure excellent in restraining the fall-off of the filler (a) and resistant to thermal contraction is formed in the coating layer (layer II) at the side of the upper surface thereof. Each of these two structures is capable of displaying the effect thereof.

It is important to set the ratio of the average particle diameter (Db) of the filler (a) to the average particle diameter (Du) thereof (Db/Du) to 1.2 to 10. Regarding the lower limit of (Db/Du), it is favorable to set to not less than 1.2 and more favorable to set it to not less than 1.5. By setting to not less than 1.2, it is possible to restrain the fall-of the filler and allow the coating layer to have sufficient resistance to the thermal contraction. Regarding the upper limit of (Db/Du), it is favorable to set to not more than 10 and more favorable to set it to not more than five. By setting to not more than 10, it is possible to restrain deterioration of aeration property which occurs because fine fillers close gaps between coarse fillers.

The average particle diameter (Du) of the filler (a) disposed at the side of the upper surface of the multilayer porous film is set to not more than 0.5 μm, favorably not more than 0.3 μm, and more favorably not more than 0.25 μm. By setting the average particle diameter (Du) to not more than 0.5 μm, the fall-off of the filler (a) can be sufficiently restrained, which is preferable. Although the lower limit of the average particle diameter (Du) of the filler (a) is not limited to a specific value, it is preferable to set the average particle diameter (Du) to not less than 0.05 μm.

The average particle diameter (Db) of the filler (a) is set to favorably not less than 0.1 μm and more favorably not less than 0.3 μm. By setting the average particle diameter (Db) thereof to not less than 0.1 μm, the interface side of the coating layer is capable of securely obtaining a high aeration property, which is preferable. On the other hand, although the upper limit of the average particle diameter (Db) of the filler (a) is not limited to a specific value, it is preferable to set the average particle diameter thereof to not more than 3.0 μm.

The density of the filler (a) of the coating layer (layer II) is set to favorably not less than twice as high as that of a resin binder (b) to be described later, more favorably not less than 2.5 times as high as the density thereof, and most favorably not less than three times as high as the density thereof. By setting the density of the filler (a) to not less than two times as high as the density of the resin binder (b), in forming the coating layer (layer II) by applying the dispersion solution containing the filler (a) and the resin binder (B) to the surface of the base layer, the filler is allowed to settle promptly after the dispersion solution is applied to the surface thereof, which is preferable.

Resin Binder (b)

The resin binder (b) which can be used in the present invention is not limited to specific kinds, provided that it is capable of favorably bonding the filler to the porous polyolefin resin film, electrochemically stable, and stable for an organic electrolytic solution when the multilayer porous film is used for a battery. Specifically an ethylene-vinyl acetate copolymer (EVA, structural unit derived from vinyl acetate is 20 to 35 mol %), an ethylene-acrylic acid copolymer such as an ethylene-ethyl acrylate copolymer, fluororesin [polyvinylidene fluoride (PVDF) and the like], fluororubber, styrene-butadiene rubber (SBR), nitrile butadiene rubber (NBR), polybutadiene rubber (BR), polyacrylonitrile (PAN), polyacrylic acid (PAA), carboxymethyl cellulose (CMC), hydroxyethyl cellulose (HEC), polyvinyl alcohol (PVA), polyvinyl butyral (PVB), polyvinyl pyrrolidone (PVP), poly (N-vinylacetamide), crosslinked acrylic resin, polyurethane, and epoxy resin are listed. These organic binders can be used singly or in combination of not less than two kinds thereof. Of these organic binders (b), the polyvinyl alcohol, the polyvinylidene fluoride, the styrene-butadiene rubber, the carboxymethyl cellulose, and the polyacrylic acid are favorable.

In the coating layer (layer II), the content rate of the filler (a) with respect to the total of the amount of the filler (a) and that of the resin binder (b) is set to favorably not less than 92 mass %, more favorably not less than 95 mass %, and most favorably not less than 98 mass %. When the content rate of the filler (a) is not less than 92 mass %, it is possible to produce the multilayer porous film having a high degree of intercommunicable property. Thus it is possible to allow the multilayer porous film to display excellent air-permeable performance and in addition, impart resistance to the thermal contraction thereto, which is preferable.

Method of Producing Coating Layer (Layer II)

In the multilayer porous film of the present invention, by applying a dispersion solution in which the filler (a) and the resin binder (b) are dissolved or dispersed in a solvent to at least one surface of the porous polyolefin resin film (layer I) and settling the filler (a) before a step of removing the solvent is performed or while the step of removing the solvent is being performed. Thereby it is possible to produce the multilayer porous film composed of the porous polyolefin resin film (layer I) having the coating layer (layer II) formed on the surface thereof. As necessary, the coating layer may be formed by applying the dispersion solution to both surfaces of the porous polyolefin resin film (layer I).

As the solvent, it is preferable to use the solvent in which the filler (a) and the resin binder (b) can be uniformly and stably dissolved or dispersed. As the solvent, it is possible to list N-methyl pyrrolidone, N,N-dimethyl formaldehyde, N,N-dimethylacetamide, water, ethanol, toluene, hot xylene, and hexane. To stabilize the dispersion solution or improve the performance of coating the surface of the porous polyolefin resin film, various additives including a dispersing agent such as a surface-active agent, a thickener, a wetting agent, an antifoam agent, a pH preparation agent including acid or alkali may be added to the dispersion solution. It is preferable to use additives which can be removed from the dispersion solution when the solvent is removed or a plasticizer is extracted. Additives which are electrochemically stable in the use range of the nonaqueous electrolytic solution secondary battery, do not inhibit a battery reaction, and are stable up to about 200° C. may remain inside the battery (inside the multilayer porous film).

As a method of dissolving or dispersing the filler (a) and the resin binder (b) in the solvent, it is possible to exemplify a mechanical stirring method to be carried out by using a ball mill, a bead mill, a planetary ball mill, a vibration ball mill, a sand mill, a colloid mill, an attritor, a roll mill, a high-speed impeller dispersion, a disperser, a homogenizer, a high-speed impact mill, ultrasonic dispersion, and a stirring blade.

As a method of applying the dispersion solution to the surface of the porous polyolefin resin film (layer I), the dispersion solution may be applied to the surface thereof after the extrusion molding finishes, after the length-direction stretching step finishes or after the width-direction stretching step finishes.

The dispersion solution application method to be adopted in the above-described dispersion solution application step is not restricted to a specific method, provided that adopted methods allow a layer to have a necessary thickness and a necessary dispersion solution application area. As the dispersion solution application method, a gravure coating method, a small-diameter gravure coating method, a bar coating method, a reverse roll coating method, a transfer roll coating method, a kiss coating method, a dip coating method, a knife coating method, an air doctor coating method, a blade coating method, a rod coating method, a squeeze coating method, a cast coating method, a die coating method, a screen printing method, and a spray applying method are listed. The dispersion solution may be applied to one surface of the porous polyolefin resin film (layer I) or to both surfaces thereof according to uses.

It is preferable to adopt a method in which at the dispersion solution application step, the surface of the porous polyolefin resin film (layer I) to which the dispersion solution is applied faces upward until the dry step finishes. By using this method, it is possible to settle the filler (a), differentiate the average particle diameters (Du) and (Db) of the filler (a) of the coating layer (layer II) from each other, and allow the ratio of the average particle diameter (Du) of the filler (a) to the average particle diameter (Db) thereof to fall within the predetermined range.

The method of settling the filler (a) to be carried out after the dispersion solution application step finishes is not limited to a specific method, provided that the settling method allows the particle diameters of the filler (a) to be differentiated in the predetermined amount in the thickness direction of the coating layer. As such settling methods, a natural settling method, a centrifugal settling method, a precipitant addition method are listed. Of these settling methods, the natural settling method is preferable in that the natural settling method can be simply carried out and used in combination with a drying step.

It is preferable to use the solvent which can be removed from the dispersion solution applied to the porous polyolefin resin film (layer I). As methods of removing the solvent from the dispersion solution, methods which do not adversely affect the porous polyolefin resin film (layer I) can be adopted without restriction. The method of removing the solvent from the dispersion solution includes a method of drying the solvent at temperatures not more than its melting point with the porous polyolefin resin film being fixed, a method of drying the solvent at low temperatures and under a reduced pressure, and a method of immersing the solvent in a poor solvent for the resin binder (b) to coagulate the resin binder (b) and at the same time extract the solvent.

In the dispersion solution application process, it is possible to apply the dispersion solutions each containing the filler (a) having different average particle diameters to the porous polyolefin resin film (layer I) at a plurality of times. In this process, after the dispersion solution containing the filler (a) having a large average particle diameter is initially applied to the surface of the porous polyolefin resin film, the solvent is dried. Thereafter the dispersion solutions each containing the filler (a) having a small average particle diameter are sequentially applied to the surface thereof, and the solvents are sequentially dried. By carrying out the application process in this manner, it is possible to differentiate the average particle diameters (Du) and (Db) of the filler (a) of the coating layer (layer II) from each other and allow the ratio of the average particle diameter (Du) of the filler (a) to the average particle diameter (Db) thereof to fall within the predetermined range.

Configuration and Property of Multilayer Porous Film

The entire thickness of the multilayer porous film of the present invention composed of the base layer consisting of the porous polyolefin resin film and the coating layer formed on the surface of the base layer is set to favorably 5 to 100 μm. The thickness thereof is set to more favorably 8 to 50 μm and most favorably 10 to 30 μm. In the case where the multilayer porous film is used as the separator for the nonaqueous electrolytic solution secondary battery, when the thickness thereof is not less than 5 μm, it is possible to obtain substantially necessary electrical insulating properties. For example, even though a great force is applied to a projected portion of an electrode, the projected portion is unlikely to cut through the separator for the battery and thus a short circuit is unlikely to occur. Thus the multilayer porous film having a thickness in the above-described range is excellent in safety. When the thickness of the multilayer porous film is not more than 100 μm, it is possible to decrease the electric resistance thereof and thus sufficiently secure the performance of the battery.

From the standpoint of the heat resistance of the coating layer (layer II), the thickness thereof is set to not less than 0.5 μm, favorably not less than 2 μm, more favorably not less than 3 μm, and especially favorably not less than 4 μm. On the other hand, regarding the upper limit of the thickness of the coating layer (layer II), the thickness thereof is set to not more than 90 μm, favorably not more than 50 μm, more favorably not more than 30 μm, and especially favorably not more than 10 μm from the standpoint of the intercommunicable property thereof.

The porosity of the multilayer porous film of the present invention is set to favorably not less than 30%, more favorably not less than 35%, and most favorably not less than 40%. When the porosity thereof is not less than 30%, the multilayer porous film secures its intercommunicable property and is excellent in its air-permeable property.

On the other hand, regarding the upper limit of the porosity thereof, the porosity thereof is set to favorably not more than 70%, more favorably not more than 65%, and most favorably not more than 60%. When the porosity thereof is not more than 70%, the strength thereof is unlikely to deteriorate, which is preferable from the standpoint of the handleability thereof. The porosity thereof is measured by using the method described in the examples to be described later.

The air permeability of the multilayer porous film of the present invention composed of the base layer and the coating layer laminated on the surface thereof is set to favorably not more than 2000 seconds/100 ml, more favorably 10 to 1000 seconds/100 ml, and most favorably 50 to 800 seconds/100 ml. When the air permeability of the multilayer porous film is not more than 2000 seconds/100 ml, the multilayer porous film has intercommunicable property and hence an excellent air-permeable performance, which is preferable.

The air permeability means the degree of difficulty in pass-through of air in the thickness direction of the film and is expressed by seconds it takes for air having a volume of 100 ml to pass through the film. Therefore the smaller a numerical value is, the more easily the air passes through the film. On the other hand, the larger the numerical value is, the more difficultly the air passes therethrough. That is, the smaller the numerical value is, the higher is intercommunicable property in the thickness direction of the film. The larger is the numerical value, the lower is the intercommunicable property in the thickness direction thereof. The intercommunicable property means the degree of connection among pores in the thickness direction of the film. When the multilayer porous film has a low air permeability, it is applicable to various uses. For example, when the multilayer porous film having a low air permeability is used as a separator of the nonaqueous electrolytic solution secondary battery, lithium ions are capable of moving easily, and thus the battery has an excellent performance, which is preferable.

The multilayer porous film of the present invention is so constructed as to have excellent SD property when it is used as the separator for the nonaqueous electrolytic solution secondary battery. Specifically, after the multilayer porous film is heated at 135° C. for five seconds, the air permeability thereof is set to favorably not less than 10000 seconds/100 ml, more favorably not less than 25000 seconds/100 ml, and most favorably not less than 50000 seconds/100 ml. By setting the air permeability of the multilayer porous film after it is heated at 135° C. for five seconds to not less than 10000 seconds/100 ml, pores close rapidly when heat is abnormally generated, and electric current is shut off. Thereby it is possible to prevent the occurrence of troubles of the battery such as rupture.

The thermal contraction rate of the multilayer porous film of the present invention composed of the base layer and the coating layer laminated on the surface thereof is set to favorably less than 25% at 150° C., more favorably less than 15%, and most favorably less than 10%. In the case where the thermal contraction rate of the multilayer porous film at 150° C. is less than 25%, even though the temperature of the battery rises over the SD temperature and abnormal heat is generated, the multilayer porous film has a favorable dimensional stability and is heat-resistant. Thus it is possible to prevent the multilayer porous film from being broken and improve an internal short-circuit temperature. Although the lower limit of the thermal contraction rate of the multilayer porous film is not specifically limited, the thermal contraction rate thereof is preferably not less than 0%.

It is favorable to set the peel-off strength between the coating layer and the porous polyolefin resin film (layer I) of the multilayer porous film of the present invention composed of the base layer and the coating layer (layer II) laminated on the surface thereof to not less than 1N/15 mm and more favorable to set the peel-off strength therebetween to not less than 3N/15 mm. When the peel-off strength therebetween is not less than 1N/15 mm, it is possible to significantly reduce the possibility of the fall-off of the filler (a) from the coating layer, which is preferable.

Battery

The nonaqueous electrolytic solution secondary battery accommodating the multilayer porous film of the present invention as the separator thereof is described below with reference to FIG. 1.

Both a positive electrode plate 21 and a negative electrode plate 22 are spirally wound in such a way that the positive electrode plate 21 and the negative electrode plate 22 are overlapped each other via a separator 10. The outer side of the positive electrode plate 21 and that of the negative electrode plate 22 are fixed with a tape to hold the wound the positive electrode plate 21, negative electrode plate 22, and separator 10 together as a unit.

The above-described winding step is described in detail below. One end of the separator for the battery is passed through a slit portion of a pin. Thereafter the pin is rotated a little to wind the other end of the separator for the battery round the pin. At this time, the surface of the pin and the coating layer (Layer II) of the separator for the battery are in contact with each other. Thereafter the positive and negative electrodes are so arranged as to sandwich the separator for the battery therebetween. The pin is rotated to wind the positive and negative electrodes and the separator for the battery by means of a winding machine. After the winding operation finishes, the pin is pulled out of the positive electrode plate, negative electrode plate, and separator wound together as a unit.

The unit composed of the positive electrode plate 21, separator 10, and negative electrode plate 22 wound together is accommodated inside a bottomed cylindrical battery case and welded to a positive lead 24 and a negative lead 25. Thereafter the electrolyte is injected into a battery can. After the electrolyte penetrates into the separator 10 sufficiently, the periphery of the opening of the battery can is sealed with a positive lid 27 via a gasket 26. Thereafter preparatory charge and aging are carried out to produce a cylindrical nonaqueous electrolytic solution secondary battery 20.

The electrolytic solution is formed by dissolving a lithium salt in an organic solvent. Although the organic solvent is not limited to a specific kind, esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxolane; and sulfolane are listed. These organic solvents can be used singly or in combination of not less than two kinds thereof. It is preferable to use an electrolyte in which 1.0 mol/L of lithium phosphate hexafluoride ($LiPF_6$) is dissolved in a solvent containing two parts by mass of the methyl ethyl carbonate mixed with one part by mass of the ethylene carbonate.

As the negative electrode, an alkali metal or a compound, containing the alkali metal, which is integrated with a current collector such as a net made of stainless steel is used. As the alkali metal, lithium, sodium or potassium is used. As the compound containing the alkali metal, alloys of the alkali metal and aluminum, lead, indium, potassium, cadmium, tin or magnesium; compounds of the alkali metal and a carbon material; and compounds of the alkali metal having a low electric potential and metal oxides or sulfides are listed. In using the carbon material for the negative electrode, it is possible to use carbon materials capable of doping or de-doping lithium ions. For example, it is possible to use graphite, pyrolytically decomposed carbons, cokes, glassy carbons, calcined organic polymeric compounds, mesocarbon microbeads, carbon fibers, and activated carbon.

A negative electrode plate produced as follows is used as the negative electrode in this embodiment. A carbon material having an average particle diameter of 10 μm is mixed with a solution in which polyvinylidene fluoride is dissolved in N-methylpyrrolidone to obtain a slurry. After the slurry, consisting of the mixture of the above-described substances, which forms the negative electrode is passed through a 70-mesh net to remove large particles, the slurry is uniformly applied to both surfaces of a negative electrode current collector consisting of a belt-shaped copper foil having a thickness of 18 μm and is dried. After the slurry is compression-molded by a roll press machine, the molding is cut to obtain the belt-shaped negative electrode plate.

A molding produced as follows is used as the positive electrode. A metal oxide such as lithium cobalt oxide, lithium nickel oxide, lithium manganese oxide, manganese dioxide, vanadium pentoxide or chromium oxide and a metal sulfide such as molybdenum disulfide is used as the active substance of the positive electrode. A conductive assistant and a binding agent such as polytetrafluoroethylene are appropriately added to the positive active substance to obtain a combination of these substances. Thereafter the combination of these substances is processed into a molding by using a current collector such as stainless steel net as the core of the positive electrode.

In this embodiment, as the positive electrode, a belt-shaped positive electrode plate produced as described below is used. That is, as a conductive assistant, scaly graphite is added to the lithium cobalt oxide ($LiCoO_2$) at a mass ratio of the lithium cobalt oxide:the scaly graphite=90:5. Both substances are mixed with each other to form a mixture. The mixture and a solution in which the polyvinylidene fluoride is dissolved in the N-methylpyrrolidone are mixed with each other to obtain a slurry. After the slurry, consisting of the mixture of these substances, which forms the positive electrode is passed through the 70-mesh net to remove large particles, the slurry is uniformly applied to both surfaces of a positive current collector consisting of an aluminum foil having a thickness of 20 μm and dried. After the slurry is compression-molded with by roll press machine, the molding is cut to obtain the belt-shaped positive electrode plate.

EXAMPLES

Examples and comparison examples are shown below. Although the multilayer porous film of the present invention is described in detail below, the present invention is not limited thereto. The longitudinal direction of the multilayer porous film is called the "length direction", and the direction vertical to the longitudinal direction is called the "width direction".

(1) Content Percentage of Filler (a)

The rate of the filler (a) is the content percentage thereof for the total of the amount of the filler (a) and that of the resin binder (b) in the dispersion solution.

(2) Fraction of Solid Content

The fraction of the solid content is set as the ratio of the total of the amount of the filer (a) and that of the resin binder (b) to 100 mass % of the dispersion solution.

(3) Film Thickness

The in-plane thickness of each multilayer porous film was measured at unspecified five points with a dial gauge of 1/1000 mm. The average of the measured values was set as the thickness thereof.

(4) Air Permeability (Gurley Value)

The air permeability (second/100 ml) of each multilayer porous film was measured in accordance with JIS P8117.

(5) Ratio Between Average Particle Diameters

By using the method in which the SEM is used, measurement was carried out on the average particle diameter (Du) of the filler (a) which is disposed downward from the upper surface of the multilayer porous film and has the thickness within 25% of the thickness of the coating layer (layer II) and on the average particle diameter (Db) of the filler (a) which is disposed upward from the interface between the coating layer (layer II) and the porous polyolefin resin film (layer I) and has the thickness within 25% of the thickness of the coating layer (layer II) to compute the ratio of the average particle diameter (Db) of the filler (a) to the average particle diameter (Du) thereof.

Average particle diameter=$Db/Du$ (6) Peel-Off Strength

Figure 3:
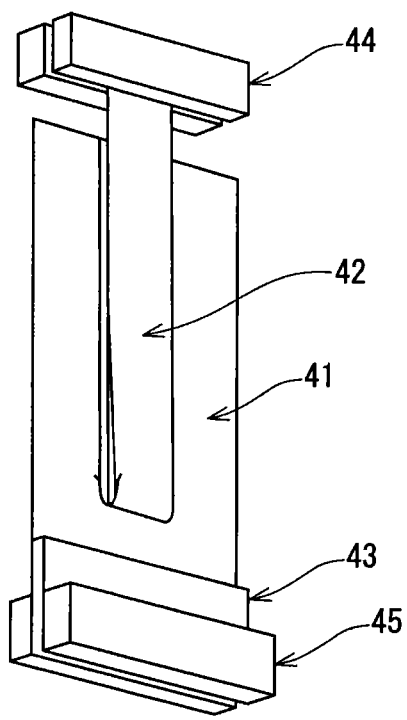
FIG. 3 explains a method of measuring peel-off strength.

In accordance with JIS Z0237, the peel-off strength between the porous polyolefin resin film (layer I) and the coating layer (layer II) was measured. Initially a sample cut out in the dimension of 50 mm wide and 150 mm long from each multilayer porous film. After a cellophane tape (JIS Z1522 produced by Nichiban Co., Ltd.) was applied to the sample as a tape 42 in the length direction thereof, the tape 42 was folded back by 180° in such a way that the back surfaces of the tape overlapped each other, the tape 42 was peeled from the sample by 25 mm. One end of the peeled portion of the sample was fixed to a lower chuck of a tensile testing machine (INTESCO IM-20ST produced by INTESCO Co., Ltd.), and the tape was fixed to an upper chuck. The peel-off strength was measured at a test speed of 300 mm/minute (FIG. 3). After the measurement finished, the measured value of the first 25 mm of the sample was ignored. An average of values of the peel-off strength measured on a length of 50 mm peeled from the specimen was set as the peel-off strength.

(7) Binding Property

The binding property was evaluated by the following evaluation criterion:

○: The peel-off strength was not less than 3N/15 mm.

Δ: The peel-off strength was not less than 1N/15 mm and less than 3N/15 mm.

x: The peel-off strength was less than 1N/15 mm.

(8) Coating Performance

The performance of coating the surface of the porous polyolefin resin film was evaluated by the following evaluation criterion:

○: The surface of the porous polyolefin resin film could be coated. A preferable coating film was formed without aggregation of particles in visible observation.

Δ: The surface of the porous polyolefin resin film could be coated. Aggregation of particles could be found in visible observation.

x: A large number of particles were aggregated. Thus it was difficult to coat the surface of the porous polyolefin resin film.

(9) Thermal Contraction Rate at 150° C.

After a mark was put on each sample cut out in the dimension of 150×10 mm from the multilayer porous film in such a way that the interval between chucks was 100 mm, the sample was put in an oven (Tabai gear oven "GPH200" produced by Tabai Espec Corporation) whose temperature was set to 150° C. and left to stand for one hour. After the sample was taken out of the oven and cooled, the length thereof was measured. The thermal contraction rate of each sample was computed by using the following equation:

Thermal contraction rate(%)={(100−length after heating)/100}×100

The length of each sample was measured in the length and width directions thereof.

(10) Heat Resistance

The heat resistance of each sample was evaluated by the following evaluation criterion:

○: The thermal contraction rate at 150° C. was less than 10% in the length and width directions thereof.

Δ: The thermal contraction rate at 150° C. was not less than 10% and less than 25% in the length and width directions thereof.

x: The thermal contraction rate at 150° C. was not less than 25% in the length and width directions thereof.

(11) Measurement of Differential Scanning Calorimetry (DSC)

By using a differential scanning calorimeter (DSC-7) produced by PerkinElmer Inc., each of the obtained multilayer porous films was heated from 25° C. up to 240° C. at a scanning speed of 10° C./minute and allowed to stand for one minute. Thereafter the multilayer porous films were cooled from 240° C. down to 25° C. at the scanning speed of 10° C./minute and allowed to stand for one minute. Thereafter the multilayer porous films were heated again from 25° C. up to 240° C. at the scanning speed of 10° C./minute. When the multilayer porous films were heated again, whether the β crystal activity was present or not was evaluated based on the following criterion according to whether a peak was detected in the range of 145° C. to 160° C. which is the crystal melting peak temperature (Tmβ) derived from the β crystal of the polypropylene resin.

○: Samples in which Tmβ was detected in the range of 145° C. to 160° C. (sample had β crystal activity).

x: Samples in which Tmβ was not detected in the range of 145° C. to 160° C. (sample did not have β crystal activity).

The β crystal activity of each sample having a weight of 10 mg was measured in a nitrogen atmosphere.

(12) Wide-Angle X-Ray Diffraction Measurement (XRD)

Figure 2:
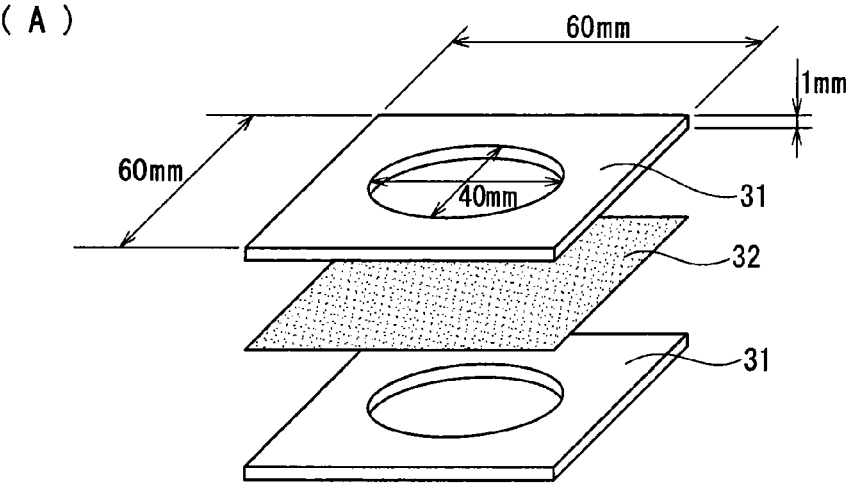
FIG. 2 explains a method of fixing the multilayer porous film in measuring SD property, heat resistance, and a wide-angle X-ray diffraction.
Figure 2:
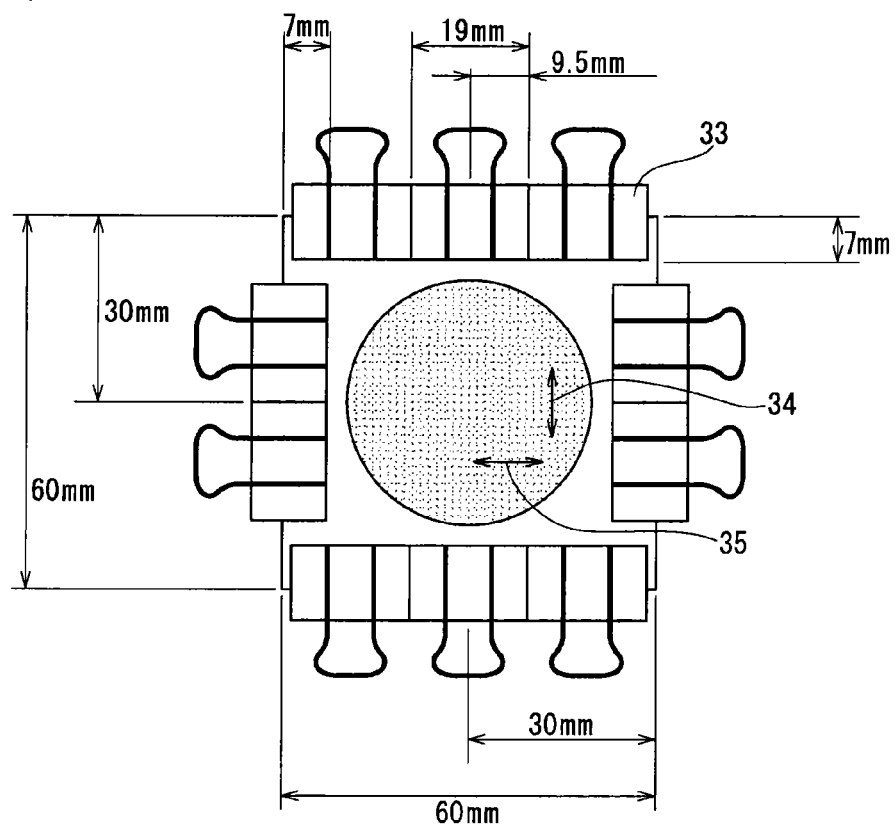

Each of the multilayer porous films was cut square in the dimension of 60 mm long and 60 mm wide. As shown in FIG. 2(A), each multilayer porous film was sandwiched between two aluminum plates (material: JIS A5052, size: 60 mm in its length direction, 60 mm in its width direction, and 1 mm in its thickness) where a circular hole having a diameter of φ40 mm was formed at its central portion. As shown in 2(B), the peripheries of the aluminum plates were fixed with clips.

Each sample in which the multilayer porous film was fixed to the two aluminum plates was put in a blow isothermal instrument (Model: DKN602 produced by Yamato Science Corporation) having a set temperature of 180° C. and a display temperature of 180° C. After each sample was allowed to stand therein for three minutes, the set temperature was altered to 100° C. Thereafter the sample was gradually cooled for not less than 10 minutes to cool it to 100° C. When the display temperature became 100° C., the sample was taken out of the blow isothermal instrument. The sample was cooled for five minutes in an atmosphere having a temperature of 25° C. with the sample being fixed to the two aluminum plates. Thereafter wide-angle X-ray diffraction measurement was carried out on the circular central portion, of the sample, having the diameter of φ40 mm in the following measuring conditions.

Wide-angle X-ray diffraction measuring apparatus: Model Number: XMP18A produced by Mac science Co., Ltd.
X-ray source: CuK α-ray, output: 40 kV, 200 mA
Scanning method: 2θ/θ scan, 2θ range: 5° to 25°, scanning interval: 0.05°, scanning speed: 5°/minute Obtained diffraction profiles were checked to evaluate whether the β crystal activity was present according to whether a peak derived from the (300) surface of the β crystal of the polypropylene resin was detected in the range of 2θ=16.0° to 16.5°.

○: Samples in which the peak was detected in the range of 2θ=16.0° to 16.5° (sample had β crystal activity)

x: Samples in which the peak was not detected in the range of 2θ=16.0° to 16.5° (sample did not have β crystal activity)

In the case where the multilayer porous film cannot be cut in the dimension of 60 mm long and 60 mm wide, samples may be prepared by placing the multilayer porous film at the circular hole, having the diameter of φ40 mm, which is disposed at the central portion of the aluminum plate.

Polyolefin Resin Film

As a layer A, polypropylene resin (Prime Polypro "F300SV" produced by Prime Polymer Co., Ltd., density: 0.90 g/cm³, MFR: 3.0 g/10 minutes) was prepared. As a β crystal nucleating agent, N,N'-dicyclohexyl-2,6-naphthalenedicarboxylic acid amide was prepared. 0.2 parts by mass of the β crystal nucleating agent and 100 parts by mass of the polypropylene resin were blended with each other. The above-described components were supplied to a co-rotation twin screw extruder (produced by Toshiba Machine Co., Ltd., diameter: 40 mmφ, L/D: 32). After the components were fused and mixed with each other at a set temperature of 300° C., a strand was cooled and solidified in a water tank. Thereafter the strand was cut with a pelletizer to produce a pellet of the polypropylene resin. The β crystal activity of the polypropylene resin composition was 80%.

Thereafter as a mixed resin composition composing a layer B, 0.04 parts by mass of glycerol monoester and 10 parts by mass of microcrystalline wax ("Hi-Mic 1080" produced by Nippon Seiro Co., Ltd.) were added to 100 parts by mass of high-density polyethylene (Novatec HD HF560 produced by Japan Polyethylene Corporation, density: 0.963 g/cm³, MFR: 7.0 g/10 minutes). The above-described components were fused and kneaded at 220° C. by using the co-rotation twin screw extruder to obtain a pelletized resin composition.

The above-described two kinds of the materials were extruded from mouthpieces for lamination molding through a feed block for forming a two-kind three-layer structure by using different extruders in such a way that the outer layers of a laminated membrane material to be obtained consisted of the layer A and the intermediate layer thereof consisted of the layer B. Thereafter the materials were cooled to solidify them by using a casting roll having a temperature of 124° C. In this manner, the laminated membrane material having the two-kind three-layer structure consisting of the layer A/the layer B/the layer A was produced.

After the laminated membrane material was stretched 4.6 times longer than its original length in its length direction by using a lengthwise stretching machine, corona discharge surface treatment was carried out. After the laminated membrane material was stretched two times longer than its original length at 100° C. in its width direction by using a widthwise stretching machine, the laminated membrane material was subjected to heat fixation/relaxation treatment. In this manner, the base layer consisting of the porous polyolefin resin film (layer I) having the two-kind three-layer structure consisting of the layer A/the layer B/the layer A and a thickness of 20 μm was obtained.

Example 1

19.7 parts by mass of alumina (Sumiko Random AA-03 produced by Sumitomo Chemical Co., Ltd., average particle diameter: 0.3 μm, and density: 3.9 g/cm$^3$) and 0.3 parts by mass of polyvinyl alcohol (PVA124 produced by Kuraray Co., Ltd., saponification degree: 98.0 to 99.0, average degree of polymerization: 2400, and density: 1.3 g/cm$^3$) were dispersed in 80.0 parts by mass of water to obtain a dispersion solution. At this time, the fraction of the solid content contained in the dispersion solution was 20 mass % for 100 mass % of the dispersion solution.

After the obtained dispersion solution was applied to one surface of the porous polyolefin resin film (layer I) composing the base layer having the two-kind three-layer structure consisting of the layer A/the layer B/the layer A by using a bar coater having a coating weight of #20, the filler was settled while the dispersion solution was being dried at 20° C. for 30 minutes to form the coating layer (layer II). In this manner, the multilayer porous film composed of the porous polyolefin resin film (layer I) and the coating layer (layer II) was formed. The entire thickness of the multilayer porous film was 25 μm. The property of the obtained multilayer porous film was evaluated. The results are shown in table 1.

Example 2

19.7 parts by mass of alumina (low soda alumina LS-235C produced by Nippon Light Metal Company, Ltd., average particle diameter: 0.5 μm, density: 3.9 g/cm$^3$) and 0.3 parts by mass of polyvinyl alcohol (PVA124 produced by Kuraray Co., Ltd., saponification degree: 98.0 to 99.0, average degree of polymerization: 2400, density: 1.3 g/cm$^3$) were dispersed in 80.0 parts by mass of water to obtain a dispersion solution X. Thereafter except that the alumina was replaced with spherical alumina ASFP-20 (average particle diameter: 0.2 μm, density: 3.9 g/cm$^3$) produced by DENKI KAGAKU KOGYO KABUSHIKI KAISHA, similarly to the dispersion solution X, a dispersion solution Y in which the spherical alumina ASFP-20 and the polyvinyl alcohol were dispersed in water was obtained. At that time, the fraction of the solid content contained in each of the dispersion solutions X and Y was 20 mass % for 100 mass % thereof.

Hydrochloric acid was added to the obtained dispersion solution X such that the fraction of the solid content in the dispersion solution X became 0.7 mass %. After the solution was applied to one surface of the porous polyolefin resin film (layer I) composing the base layer having the two-kind three-layer structure consisting of the layer A/the layer B/the layer A by using the bar coater having a coating weight of #10, the solution was dried at 60° C. for two minutes. Thereafter the dispersion solution Y was applied to one surface of the porous polyolefin resin film (layer I) by using the bar coater having the coating weight of #10, the dispersion solution Y was dried at 60° C. for two minutes to form the coating layer (layer II). In this manner, the multilayer porous film composed of the porous polyolefin resin film (layer I) and the coating layer (layer II) was formed. The entire thickness of the multilayer porous film was 26 μm. The property of the obtained multilayer porous film was evaluated. The results are shown in table 1.

Comparison Example 1

39.4 parts by mass of the alumina (Sumiko Random AA-03 produced by Sumitomo Chemical Co., Ltd., average particle diameter: 0.3 μm, density: 3.9 g/cm$^3$) and 0.6 parts by mass of the polyvinyl alcohol (PVA124 produced by Kuraray Co., Ltd., saponification degree: 98.0 to 99.0, average degree of polymerization: 2400, density: 1.3 g/cm$^3$) were dispersed in 60.0 parts by mass of water to obtain a dispersion solution. At that time, the fraction of the solid content contained in the dispersion solution was 40 mass % for 100 mass % of the dispersion solution.

Similarly to the example 1, after the obtained dispersion solution was applied to one surface of the porous polyolefin resin film (layer I) composing the base layer having the two-kind three-layer structure consisting of the layer A/the layer B/the layer A by using the bar coater having the coating weight of #10, the dispersion solution was dried at 60° C. for two minutes. In this manner, the multilayer porous film having an entire thickness of 27 μm was obtained.

The property of the obtained multilayer porous film was evaluated. The results are shown in table 1.

Comparison Example 2

The coating layer was not formed on the porous polyolefin resin film of the comparison example 2.

The properties of the obtained multilayer porous films were evaluated. The results are shown in table 1.

TABLE 1

| | | Example 1 | Example 2 | Comparison example 1 | Comparison example 2 |
|---|---|---|---|---|---|
| Average particle diameter (Du) | μm | 0.20 | 0.17 | 0.27 | — |
| Average particle diameter (Db) | μm | 0.34 | 0.52 | 0.22 | — |
| Ratio (Db/Du) | — | 1.7 | 3.1 | 0.8 | — |
| Thickness | μm | 25 | 26 | 27 | 20 |
| Permeability | Second/100 ml | 536 | 547 | 556 | 508 |
| Peel-off strength | N/15 mm | 3.5 | 3.3 | 2.5 | — |
| Binding performance | — | ○ | ○ | Δ | — |
| | | ○ | ○ | ○ | — |
| Thermal contraction rate at 150° C. | Length direction % | 8 | 6 | 13 | 25 |
| | Widthwise direction % | 1 | 6 | 2 | 26 |

TABLE 1-continued

|  | Example 1 | Example 2 | Comparison example 1 | Comparison example 2 |
|---|---|---|---|---|
| Heat resistance | — | ○ | ○ | Δ | x |
| DSC | — | ○ | ○ | ○ | ○ |
| XRD | — | ○ | ○ | ○ | ○ |

As shown in table 1, in the multilayer porous films obtained in the examples 1 and 2, the particle diameter of the filler (a) disposed in each region was set within the predetermined range. Therefore the coating layer of each of the examples 1 and 2 maintained a high aeration property and displayed excellent heat resistance. That is, because fine particles disposed at the upper surface side of each of the coating layers formed a dense structure, each coating layer had an excellent binding force between fillers and excellent heat resistance at the upper surface side of each coating layer. On the other hand, because particles disposed at the interface side of each coating layer (layer II) formed a coarse structure, each coating layer (layer II) was capable of maintaining a high aeration property at its interface side.

On the other hand, in the multilayer porous film obtained in the comparison example 1, the composition of the solid content contained in the coating solution was the same as that of the example 1. But the particle diameter disposed in each region was not set within the predetermined range. Thus the coating layer of the multilayer porous film was insufficient in its filler-binding force and heat resistance.

Because the coating layer was not formed on the porous polyolefin resin film of the comparison example 2, the porous polyolefin resin film was insufficient in its heat resistance.

INDUSTRIAL APPLICABILITY

The multilayer porous film of the present invention can be applied to various uses in which air-permeable property is demanded. The multilayer porous film can be suitably used as a material for the separator of a battery; materials for hygienic products such as disposable diaper, body fluid absorbing pats such as sanitary products, a bed sheet, and the like; materials for medical supplies such as surgical gown, a base material for stupe, and the like; materials for clothing items such as jumper, sportswear, rain wear, and the like; building materials such as wallpaper, a roof-waterproofing material, a heat insulation material, a sound-absorbing material, and the like; a material for a container of a desiccant; a material for a container of a moisture agent; a material for a container of a deoxidizer; a material for a pocket warmer; and a material for a package of packing foods to keep them fresh, and a material for a package of packing foods.

EXPLANATION OF REFERENCE SYMBOLS AND NUMERALS

20: secondary battery
21: positive electrode plate
22: negative electrode plate
24: positive lead
25: negative lead
26: gasket
27: positive lid
31: aluminum plate
32: porous film
33: clip
34: length direction of porous film
35: width direction of porous film
41: sample
42: tape
43: non-slip strip
44: upper chuck
45: lower chuck

| EXPLANATION OF REFERENCE SYMBOLS AND NUMERALS | |
|---|---|
| 20: | secondary battery |
| 21: | positive electrode plate |
| 22: | negative electrode plate |
| 24: | positive lead |
| 25: | negative lead |
| 26: | gasket |
| 27: | positive lid |
| 31: | aluminum plate |
| 32: | porous film |
| 33: | clip |
| 34: | length direction of porous film |
| 35: | width direction of porous film |
| 41: | sample |
| 42: | tape |
| 43: | non-slip strip |
| 44: | upper chuck |
| 45: | lower chuck |

The invention claimed is:

1. A multilayer porous film, comprising:
a coating layer,
a filler,
a resin binder, and
a base layer comprising a porous polyolefin resin film,
wherein
said coating layer is laminated on at least one surface of the porous polyolefin resin film of said base layer,
Du is an average particle diameter of said filler which is disposed downward from an upper surface of said coating layer composing an upper surface of said multilayer porous film and has a thickness within 25% of a thickness of said coating layer,
Db is an average particle diameter of said filler which is disposed upward from an interface between said coating layer and said base layer and has a thickness within 25% of said thickness of said coating layer,
a ratio of Db/Du is a value of from 1.2 to 10; and
Du is not more than 0.5 μm.

2. The multilayer porous film according to claim 1, wherein Db is not less than 0.1 μm nor more than 3.0 μm.

3. The multilayer porous film according to claim 1, wherein
Du is from 0.05 μm to 0.5 μm;
Db is from 0.1 μm to 3.0 μm;
an average particle diameter of said filler disposed in a region between the filler having the average particle diameter of Du and the filler having the average particle diameter of Db is a value between Du and Db; and
said filler of said coating layer has an average particle diameter increasing from said upper surface of said coating layer to said interface between said coating layer and said base layer.

4. The multilayer porous film according to claim 1, wherein said filler has a density of not less than twice as a density of said resin binder.

5. The multilayer porous film according to claim 1, wherein said porous polyolefin resin film of said base layer comprises a layer comprising polypropylene resin as a main component thereof.

6. The multilayer porous film according to claim 1, wherein said porous polyolefin resin film of said base layer is a laminated film consisting of
 layer A comprising polypropylene resin as a main component thereof, and
 a layer, which is at least one of a layer B consisting of polyolefin resin other than said polypropylene resin and a layer consisting of resin other than said polyolefin resin and is laminated upon the layer A; and
 said coating layer is laminated on a surface of said base layer consisting of said laminated film.

7. The multilayer porous film according to claim 1, wherein said porous polyolefin resin film of the base layer has a β crystal activity.

8. The multilayer porous film according to claim 1, wherein a peel-off strength between said base layer and said coating layer is not less than 3N/15 mm.

9. The multilayer porous film according to claim 1, wherein said multilayer porous film has a thermal contraction rate of less than 25% at 150° C.

10. A separator, consisting of the multilayer porous film according to claim 1,
 wherein the separator is suitable for a nonaqueous electrolytic solution secondary battery.

11. A nonaqueous electrolytic solution secondary battery, comprising the separator according to claim 10.

12. A method of producing the multilayer porous film according to claim 1, the method comprising:
 obtaining a dispersion solution in which said filler and said resin binder are dissolved or dispersed in a solvent;
 applying the dispersion solution to the at least one surface of said porous polyolefin resin film, thereby obtaining said base layer; and
 setting the ratio of Db/Du to be from 1.2 to 10 either when said filler is settled toward said base layer before removing said solvent or while said solvent is removed.

13. A method of producing the multilayer porous film according to claim 1, the method comprising:
 applying a first dispersion solution comprising filler having a large average particle diameter to the at least one surface of said porous polyolefin resin film, and
 subsequently applying a second dispersion solution comprising filler having a small average particle diameter to the first dispersion solution to set the ratio of Db/Du to be from 1.2 to 10.

14. The method according to claim 12, further comprising:
 heat-treating said multilayer porous film at not less than 100° C. nor more than 170° C. before said applying or after forming said coating layer on said base layer, and
 subjecting said multilayer porous film to a relaxation treatment at 1 to 20%, while said multilayer porous film is heat-treated to set a thermal contraction rate at 150° C. to be less than 25%.

15. The method according to claim 13, further comprising:
 heat-treating said multilayer porous film at not less than 100° C. nor more than 170° C. before applying said first dispersion solution or after forming said coating layer on said base layer, and
 subjecting said multilayer porous film to a relaxation treatment at 1 to 20%, while said multilayer porous film is heat-treated to set a thermal contraction rate at 150° C. to be less than 25%.

* * * * *